United States Patent
Waite et al.

[15] 3,673,410
[45] June 27, 1972

[54] METHOD OF EXAMINATION OF CELL SAMPLES USING A RADIOACTIVELY TAGGED DYE

[72] Inventors: John H. Waite, 46 Grove St., Haddonfield, N.J. 08033; John H. Nodine, 523 Richards Road, Wayne, Pa. 19087

[22] Filed: June 9, 1970

[21] Appl. No.: 44,818

Related U.S. Application Data

[63] Continuation-in-part of Ser. Nos. 836,439, June 25, 1969, abandoned, and Ser. No. 24,441, April 30, 1970, abandoned.

[52] U.S. Cl. ...................... 250/106 T, 23/230 B, 23/253 R, 250/71 T, 250/71.5 R, 250/833 R, 252/301.1 R, 421/1
[51] Int. Cl. ........................................ G21h 5/02, G01t 1/20
[58] Field of Search ............ 250/106 T, 71 T, 71.5 R, 83.3 R; 252/301.1 R; 23/230 B, 253 R; 424/1

[56] References Cited

OTHER PUBLICATIONS

Konrad, C.; " Protein Synthesis and RNA Synthesis During Mitosis in Animal Cells," Journal of Cell Biology; 1963, Vol. 19, pp. 267– 277

*Primary Examiner*—James W. Lawrence
*Assistant Examiner*—Morton J. Frome
*Attorney*—Howson and Howson

[57] ABSTRACT

A sample of cells from a body under investigation is treated with a radioactively tagged substance which is determined to be selectively absorbed by one or more predetermined cell types sought to be identified either as disease producing cells or abnormal cells of the body and distinguished from other cell types. The radioactively tagged substance is aborbed in different amounts by some cells and rejected by other cells. After treatment and washing, the level of radioactivity of the cell sample is sensed in order to determine from the degree of absorption of the radioactively tagged substance information about the presence of absence of disease. The technique may be applied to mass screening for disease of a particular type or types by collecting and identifying similar samples from many subjects and using a predetermined common standard of radiation level to eliminate those samples which are clearly free from disease.

26 Claims, 1 Drawing Figure

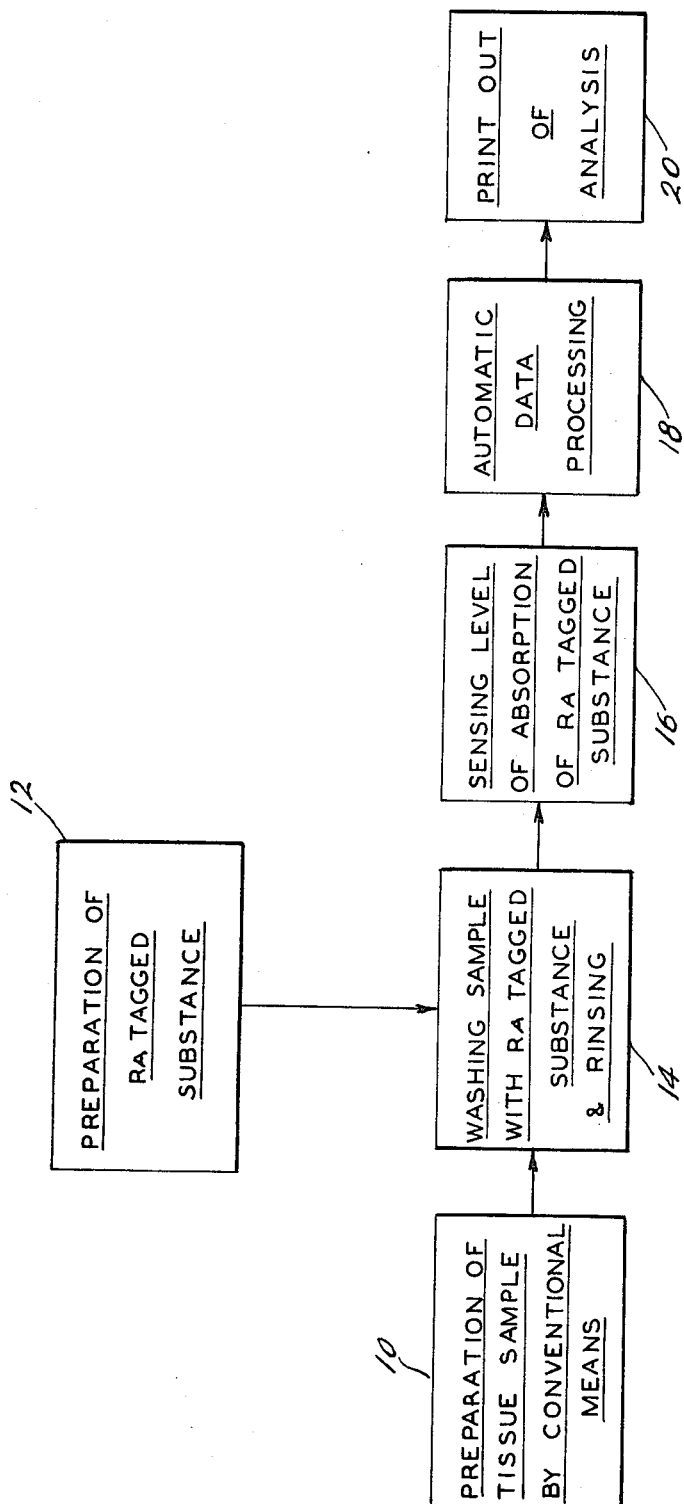

METHOD OF EXAMINATION OF CELL SAMPLES USING A RADIOACTIVELY TAGGED DYE

This application is a continuation in part of applications Ser. No. 836,439, filed June 25, 1969, now abandoned and Ser. No. 24,441 filed Apr. 3, 1970 now abandoned.

The present invention relates to a method of examination of cells for evidence of disease. More specifically, it relates to a method of treatment of a sample of cells from a body under investigation with a radioactively tagged substance which is selectively absorbed by one or more predetermined cell types sought to be identified. Information about the presence or absence of disease is determined by sensing the level of radioactivity of the sample. Moreover, the technique may be applied in mass screening using samples collected from a plurality of subjects and applying a predetermined common standard of radiation level to eliminate those samples which are clearly free from disease.

The technology of medical stains is based upon the colorometric properties of the stain, and the affinity of certain stains to attach themselves molecularly to specific medical specimens. This invention involves the addition of radioactive properties to the stain by tagging the desired stain radioactively which stain will then emit a signal which can be detected by a scintillation counter, and digitalized for computer processing and analysis. However, this invention, as will appear below, makes possible the elimination of reliance on visual detection by color and, since sensing relies on the radioactive property of the "stain," permits the use of a completely colorless radioactively tagged substance which is selectively absorbed by cells sought to be identified.

The present invention as originally conceived, for example, relates to a method of examination of cytological specimens associated with the Papanicolaou procedures for identifying cancer. More specifically, it relates to a method of staining or dyeing a tissue sample (e.g. vaginal smear) with a radioactively tagged dye or dyes which become attached molecularly to predetermined types of cell substances. As a result of this dyeing and a washing process, it is possible to differentiate between normal cells, diseased cells and inflammatory cells; and in this way identify a cancer suspect.

In the prior art, techniques have been developed for coloring cells, bacteria, virus, fungi and tissue samples with dyes which are rejected, for example, by normal cells but absorbed by cells affected by a particular disease, such as cancer. Numerous dyes have been developed which are capable of this type of use and various dyes are known to be useful in connection with various diseases or disorders.

The dyeing of cells in a tissue sample has proved to be highly accurate as a visual indicator of certain diseases and disorders, such as cancer. The difficulty with making analyses in this way is that it is time-consuming and tedious, and the cytologist, or the specialist making the examination, must be highly skilled. Thus the process is not only expensive, but it is, as a practical matter, impossible to make examinations of this type or automate the process on a mass basis. Even for cancer alone where perhaps 5 percent of those persons needing such examination actually receive it, there are insufficient skilled technicians available for much additional work more than is currently being performed.

The limitations on the procedure are in the examination of the sample. The slow and tedious visual examination cannot be speeded up without loss in the accuracy of the results. Such losses cannot be tolerated. On the other hand, techniques have been perfected for mass handling and processing of slides bearing the sample, even where elaborate complicated or highly sensitive chemical processes are involved. These processes are well-known and can be adequately and carefully controlled by mass techniques using automatic or semi-automatic equipment.

The present invention occurred as a result of our search to establish a method to digitalize the histological information at its source - the cell itself.

The colorometric methods limited the cell research to optical systems where the initial signal was too weak for the attainment of a good signal-to-noise level, which defeated automation, requisite to mass screening. The present invention occurred due to our search for a means to eliminate the need for visual microscopic inspection of all of the slides processed. The present invention provides such a means. The present invention permits the automatic inspection of tissue samples by non-human sensors, such as radiation detectors of various known types, and requires re-examination for confirmation by human visual analysis in relatively few cases.

More specifically, the present invention permits the substitution for the color indicator dye of a substance which is radioactively tagged. Such a substance may also be a dye capable of color indication as has been done in the prior art, or it may be a substance whose color has no significance, or one which is completely colorless.

The concept of the present invention has been broadened so that it is not limited to cancer detection or even to detection of abnormal cells in a tissue sample which may also contain normal cells. In its present concept, the present invention is related to detection of radioactively tagged cells. These cells are treated by a radioactively tagged substance which is selectively absorbed by cells of one or more predetermined cell types sought to be identified. It can be applied, for example, to cultures of disease producing cells as well as tissues and blood or other body fluid samples. Bacteria, fungi, and other microorganisms, and viruses are intended to be included within the term "cell" as used herein, provided they are susceptible to selective absorption of radioactively tagged substances. In all cases the present invention employs "fixed" samples, that is, samples of dead tissue, cells or microorganisms, and is best employed where hundreds of samples of the same kind are to be considered.

The present invention, as suggested above, also makes possible a novel technique of mass screening. In this method similar samples are collected from a plurality of subjects and identified as to its subject source. The samples are treated and detected as previously specified. Thereafter, using a predetermined common standard of radiation those samples which are clearly free of disease are eliminated, leaving only those above that level for visual inspection or other tests.

For a better understanding of the present invention reference is made to the accompanying drawing which is a block diagram showing the steps of the process of the present invention.

The preparation of samples by conventional means 10 used with fixed samples, is done by doctors or technicians in the present conventional way. The preparation of the radioactively tagged substances 12, may require special techniques and know-how for the preparation of a given type of dye. However, the staining techniques are conventional techniques similar to those used with dyes intended to color the samples for visual observation by a cytologist. Washing the sample with the radioactively tagged substance and subsequently rinsing, 14, tags the sample with radioactive material allowing absorption by abnormal cells and subsequently washing excess unabsorbed amounts away, as necessary. These steps can be done by a cytologist or other skilled technical people. In many cases this is done in a manner akin to the present highly developed dyeing techniques and may involve similar processes.

Once the sample is prepared and tagged, it is ready for examination. Instead of using a microscope, however, the level of absorption of the radioactively tagged substance is sensed by suitable radiation sensing means, such as radiation detectors of various commercial forms of suitable sensitivity. The sensing of the level of absorption of the radioactively tagged substance, 16, is akin to other radiation measurements made today. It may be made by technicains or handled automatically in suitable apparatus. The count of the radiation counter over a predetermined period of time can be used as data for an automatic data processing system, 18, which compares this date with critical criteria and prints out an analysis, 20, of the comparison by conventional print-out means, such as one of the types associated with digital computers.

EXAMPLE 1

Negative, cancer positive and inflammatory samples of cervical smears were prepared using the papanicolaoy process with conventional methods.

The radioactively tagged substance used to stain the slides was a 1 percent aqueous solution of $^{14}C$ methylene blue (methylene blue synthesized to contain 1.3 millicuries/gram).

The tissue samples were washed with one drop of the $^{14}C$ methylene blue solution, and abnormal cells absorbed the radioactively tagged material. The samples were then rinsed with water and dried at room temperature. This washing and rinsing followed conventional procedures for staining slides.

Next the tagged sample was sensed by a liquid scintillation radiation counter (model 724) made by Nuclear Chicago, after cutting the slides to provide pieces of a size to fit the counter. A conventional xylene solution of the standard fluors, POP and POPOP, was used.

The results obtained from conventional analysis were compared with the radioactively tagged results and found to be correctly correlated.

The counts themselves varied by the following table:

|  | From count of— | To count of— |
| --- | --- | --- |
| Negatives | 1 | 15 |
| Positives | 1,000 | 2,000 |
| Inflammatories | 10,000 | 30,000 | and were determined to have indication of cancer by radiation level detected (i.e. the scintillation count). In all of the cases the radioactively tagged substance used was capable of visual examination. A visual examination of the sample was made independently and the results correlated 100 percent n the two situations.

EXAMPLE 1a

In later test work blank slides as well as slides baring normal cervix cells, cells indicating carcinoma of cervixs and inflammed cervix cells (cervicitis) were prepared, using the Papanicolaou process with conventional methods.

The radioactively tagged substance, $^{14}C$ methylene blue, (1 percent aqueous solution) was used to stain the slides. The tissue samples were washed with one drop of the radioactively tagged substance and the cells absorbed the radioactively tagged material in different amounts. The samples were rinsed with water and dried. The process used for washing except for the use of the radioactive methylene blue, was conventional. One slide, without a tissue sample, was treated with one drop of the $^{14}C$ methylene blue solution, rinsed and dried to serve as a blank or control.

Next the tagged samples were sensed by a liquid scintillation radiation counter (model 724) made by Nuclear Chicago as in Example 1. The counts detected for the various slides are shown in the following table:

PARTICULAR EXAMPLE

|  | Counts/minute | Range of various samples, counts/minute |
| --- | --- | --- |
| Blank slide | 20 | 10–37 |
| Normal cervix cells | 140 | 8–250 |
| Carcinoma of cervix | 414 | 300–2,400 |
| Cervicitis (inflammation) | 12,953 | 8,000–30,000 |

The results obtained from the conventional visual analysis by microscope were compared with the radioactively tagged results obtained using the radiation counter and found to be correctly correlated.

EXAMPLE 2

Blank slides as well as slides bearing normal cervix cells, cells indicating carcinoma of cervix and inflammed cervix cells (cervicitis) were prepared using the Papanicolaou process with conventional methods.

The radioactively tagged substance, $^3H$ hematoxylin (hematoxylin tagged by catalytic tritiation, 750,000 microcuries/gram), was used to stain the slides. The tissue samples and blank were washed with the radioactively tagged solution 2 percent conc. in water) and the cells absorbed the radioactively tagged material in different amounts. The slides were washed with water and dried following conventional procedure as in Example 1.

Next, the tagged samples were sensed by a liquid scintillation radiation counter made by Nuclear Chicago as in Example 1. The counts detected for the various slides are shown in the following table:

PARTICULAR EXAMPLE

|  | Counts/minute | Range of various samples counts/minute |
| --- | --- | --- |
| Blank slide | 12 | 8–22 |
| Normal cervix cells | 60 | 35–105 |
| Carcinoma of cervix | 180 | 120–450 |
| Cervicitis (inflammation) | 3,460 | 800–12,000 |

The results obtained from the conventional visual analysis by microscope were compared with the radioactively tagged results obtained using the radiation counter and found to be correctly correlated.

EXAMPLE 3

Blank slides and slides bearing abnormal prostate cells which were respectively prostatic hypertrophy and adenocarcinoma of prostate. No normal prostate tissue was examined. The samples were prepared conventionally using the standard paraffin block sections, paraffin block techniques and deparaffinization process.

The radioactively tagged substance employed to stain the slides was $^3H$ basic fuchsin (basic fuchsin tagged by catalytic tritiation, 43 millicuries/30 mg disolved in 100 ml of 95 percent alcohol). The solution was prepared by adding to one milliliter of the $^3H$ basic fuchsin solution, 0.4 g. of normal basic fuchsin, 0.8 g. phenol, 2 ml. of 95 percent alcohol and 10 ml. distilled water. The tissue samples and blank were washed with the radioactively tagged substance and different types of cells absorbed the radioactively tagged substance in different amounts. The slides were washed with water and dried. The process used was conventional.

Next some of each type of the slides were bleached using a standard decolorization solution of 1 ml. HCl (conc.) and 99 ml. of 95 percent alcohol for 2 minutes and subsequently washing with tap water for 5 minutes.

Counts actually taken, using the procedure of Example 1, using the various slides prepared are shown in the following table:

PARTICULAR EXAMPLE

|  | Counts/minute | Range of various samples, counts/minute |
| --- | --- | --- |
| Blank slide | 27 | 13–48 |
| Prostatic hypertrophy (plain) | 39,510 | 20,000–40,000 |
| Adenocarcinoma of prostate (plain) | 47,014 | 42,000–76,000 |
| Prostatic hypertrophy (bleached) | 7,471 | 4,000–8,500 |
| Adenocarcinoma of prostate (bleached) | 12,514 | 9,000–22,000 |

From the above it will be seen that an improved spread occurred with bleaching.

Again, the results obtained from the conventional visual analysis by microscope were compared with the radioactively tagged results obtained using the radiation counter and found to be correctly correlated.

EXAMPLE 4

The procedure of Example 3 was followed, except that only bleached samples were used and no normal basic fuchsin was added to the $^3H$ basic fuchsin. Thus, no visible microscopic uptake of color occurred and only radioactive detection was possible.

The results were as follows:

PARTICULAR EXAMPLE

| | Counts/ minute | Range of various samples, counts/ minute |
|---|---|---|
| Blank slide | 22 | 13–48 |
| Prostatic hypertrophy (bleached) | 14,842 | 13,000–15,000 |
| Adenocarcinoma of prostate (bleached) | 17,567 | 15,000–18,000 |

EXAMPLE 5

The procedure and material of Example 3 were used for visual and radioactive detection of malaria, straphalococcus, pneumonococcus, tuberculosis, coliform bacteria, leukemia and trypansomiasis. Samples 2, 3 and 9, below, were infected mouse and human blood, respectively. Samples 4, 5 and 7 were cultures from agar of the designated microorganisms taken from diseased patients. Sample 6 was from a standard paraffin section of a diseased human lung. Sample 8 was from a mouse heart culture of the designated microorganism taken from a diseased patient.

The results were as follows:

PARTICULAR EXAMPLE

| | | Counts/ minute | Range of various samples, counts/minute |
|---|---|---|---|
| 1 | Blank slide | 22 | 13–48 |
| 2 | Plasmodium vivax (human malaria) | 1,096 | 800–1,200 |
| 3 | Plasmodium berghei (mouse malaria) | 833 | 600–900 |
| 4 | Staphylococcus aureus | 3,513 | 2,500–4,000 |
| 5 | Pneumococcus | 1,046 | 800–1,200 |
| 6 | Tuberculosis (human) | 2,029 | 1,500–2,500 |
| 7 | E. Coli | 818 | 100–900 |
| 8 | Trypanosoma cruzi (human chagas disease) | 2,296 | 1,800–3,000 |
| 9 | Leukemia (human) | 1,377 | 1,000–1,800 |

EXAMPLE 6

Specimens of the same type as tested in Example 5 were treated using the procedure and $^{14}C$ methylene blue solution of Example 1.

The results were as follows:

PARTICULAR EXAMPLE

| | | Counts/ minute | Range of various samples, counts/minute |
|---|---|---|---|
| 1 | Blank slide | 18 | 16–22 |
| 2 | Plasmodium vivax (human malaria) | 59 | 43–78 |
| 3 | Plasmodium berghei (mouse malaria) | 351 | 250–500 |
| 4 | Staphylococcus aureus | 1,353 | 1,000–7,000 |
| 5 | Pneumococcus | 114 | 80–200 |
| 6 | Tuberculosis (human) | 207 | 150–300 |
| 7 | E. coli | 1,966 | 1,650–2,550 |
| 8 | Trypanosoma cruzi (human chagas disease) | 352 | 250–500 |
| 9 | Leukemia (human) | 152 | 100–200 |

Although reference has been made in the foregoing Examples to techniques employing slides of the samples, it will be realized that the present invention is not limited to examination of samples on slides, but may be applied to samples in other forms, such as liquid forms prepared as by treating the sample, for example in a container with the radioactively tagged substance, adding water to rinse away unabsorbed radioactively tagged substance and separating the tagged sample from the liquid phase such as by centrifuging. Cellular dispersion may be made by any of several conventional means, such as ultrasonics and/or mechanical means.

We claim:

1. In the method for detecting disease, employing the steps of obtaining and preparing a sample containing fixed tissue, cells or microorganisms, staining the sample with an appropriate dye, appropriately washing the sample and then examining the sample, the improvement comprising
   in the process step known per se of staining said fixed sample, using a radioactively tagged dye so that the affinity of the dye to the cells or tissues or microorganisms is utilized to bind the radioisotope of the tagged dye to the fixed tissue, cells or microorganisms,
   in the process step of examining the sample after the staining and washing steps are completed, sensing the level of radioactivity of the sample as a whole,
   from said level of radioactivity sensed, comparing the level of radioactivity with a predetermined common standard of radiation level to determine if the sample is clearly free from disease, and
   if the sample is not shown to be clearly free from disease, further processing the sample to determine the presence or absence of disease.

2. The method of claim 1 in which the dye employed has affinity for diseased cells or microorganisms within the sample.

3. The method of claim 1 in which the sample is one of tissue or cells and the dye employed is selected for its affinity to cells of a selected type sought to be identified.

4. The method of claim 3 in which the cells sought to be identified are cancer cells and the dye selected has greater affinity for cancerous than for normal cells of the same type.

5. The method of claim 4 in which cervix cells are examined.

6. The method of claim 4 in which blood cells are examined for lukemia.

7. The method of claim 3 in which the lung tissue is examined.

8. The method of claim 3 in which prostate tissue is examined.

9. The method of claim 1 in which the sample is one potentially containing microorganisms of a predetermined type and the dye employed is selected for its affinity to micro-organism of that predetermined type.

10. The method of claim 9 in which the microorganisms sought to be identified are parasites of selected type and the dye selected has greater affinity for such parasites than other substances which may occur in the sample.

11. The method of claim 10 in which malaria parasites are examined.

12. The method of claim 10 in which trapanosomiasis parasites are examined.

13. The method of claim 9 in which the microorganisms sought to be identified are bacteria of selected type and the dye selected has greater affinity for such bacteria than other substances which may occur in the sample.

14. The method of claim 9 in which the microorganisms sought to be identified are fungi of selected type and the dye selected has greater affinity for such fungi than other substances which may occur in the sample.

15. The method of claim 13 in which samples are examined for pneumonicocus.

16. The method of claim 13 in which samples are examined for tuberculosis.

17. The method of claim 13 in which samples are examined for vaginitis.

18. The method of claim 13 in which samples are examined for intestinal diseases.

19. The method of claim 1 employing $3_H$ hematoxylin as the radioactively tagged dye.

20. The method of claim 1 employing $3_H$ basic fuchsin as the radioactively tagged dye.

21. The method of claim 1 employing $14_C$ methylene blue as the radioactively tagged dye.

22. The method of claim 1 in which the radioactively tagged substance employed also colors the cells of predetermined type and is rejected by others.

23. The method of claim 1 in which non-colorimetric radioactive tagging of the sample is of significance.

24. The method of claim 1 in which the fixed sample contains cells of the predetermined type of a size too small to show by colorimetric staining techniques but which will absorb the radioactively tagged substance in sufficient amounts for positive identification.

25. The method of claim 1 in which the information content in the fixed sample itself is digitalized directly through the radioactive emission so that it can be directly used as a computer input.

26. The method of mass screening of a plurality of subjects for disease of a particular type, comprising collecting and identifying similar samples of tissue, cells or microorganisms from a plurality of subjects, and preparing the samples as fixed samples for staining, staining each sample with a radioactively tagged dye which is determined to be selectively absorbed by samples of the type under investigation so that the affinity of the dye to the cells, tissues or microorganisms is utilized to bind the radioisotope of the tagged dye to the fixed tissues, cells or microorganisms, appropriately washing the samples, sensing the level of radioactivity of each sample, from said levels of radioactivity sensed, eliminating those samples which are clearly free from disease by comparing the level of radioactivity of each sample with a predetermined common standard of radiation level, and further processing those samples not shown to be clearly free from disease to determine the presence or absence of disease.

* * * * *

UNITED STATES PATENT OFFICE
CERTIFICATE OF CORRECTION

Patent No. 3,673,410                                Dated June 27, 1972

Inventor(s) John H. Waite and John H. Nodine

It is certified that error appears in the above-identified patent and that said Letters Patent are hereby corrected as shown below:

Assignee is not shown on the patent. Assignee is Bio-Digital Sciences, Inc. Assignment was recorded in the Patent Office on January 22, 1971, at Reel 2681, Frames 087-088.

Abstract, line 6, change "aborbed" to --absorbed--.

Column 2, line 73, change "date" to --data--.

Column 3, line 39, change "n" to --in--.

Column 5, line 67, change "coli" to --Coli--.

Signed and sealed this 6th day of February 1973.

(SEAL)
Attest:

EDWARD M. FLETCHER, JR.                ROBERT GOTTSCHALK
Attesting Officer                       Commissioner of Patents